United States Patent [19]

Haeberle, Jr. et al.

[11] Patent Number: 4,877,435

[45] Date of Patent: Oct. 31, 1989

[54] MECHANICALLY ALLOYED NICKEL-COBALT-CHROMIUM-IRON COMPOSITION OF MATTER AND GLASS FIBER METHOD AND APPARATUS FOR USING SAME

[75] Inventors: Ronald M. Haeberle, Jr.; Gaylord D. Smith; John H. Weber; Roneldo L. Fisher, all of Huntington, W. Va.; David J. Gaul, Granville; Jay W. Hinze, Newark, both of Ohio

[73] Assignees: Inco Alloys International, Inc., Huntington, W. Va.; Owens-Corning Fiberglas Corporation, Toledo, Ohio

[21] Appl. No.: 307,485

[22] Filed: Feb. 8, 1989

[51] Int. Cl.$^4$ .................... C22C 19/05; C03B 37/095; C21D 8/00
[52] U.S. Cl. ............................... 65/1; 65/8; 65/15; 65/374.12; 75/234; 75/236; 148/410; 148/428; 420/445; 420/446; 420/449; 420/450
[58] Field of Search .................. 65/1, 8, 15, 374, 12; 420/445, 446, 448, 449, 450; 148/410, 428; 75/234, 236

[56] References Cited

U.S. PATENT DOCUMENTS

| | | | |
|---|---|---|---|
| 3,318,694 | 5/1967 | Heitmann | 65/15 |
| 3,591,362 | 7/1971 | Benjamin | 75/0.5 BA |
| 3,776,704 | 12/1973 | Benjamin | 29/182.5 |
| 3,984,240 | 10/1976 | Costin | 65/15 X |
| 4,066,448 | 1/1978 | Haeberle, Jr. | 75/171 |
| 4,274,852 | 6/1981 | McGarry | 65/2 |
| 4,367,083 | 1/1983 | Gaul | 65/374.12 X |
| 4,386,976 | 6/1983 | Benn et al. | 148/410 |
| 4,402,767 | 9/1983 | Hinze et al. | 148/11.5 P |
| 4,668,312 | 5/1987 | Benn et al. | 148/410 |

Primary Examiner—Robert L. Lindsay
Attorney, Agent, or Firm—Francis J. Mulligan, Jr.; Edward A. Steen

[57] ABSTRACT

A mechanically alloyed composition of matter or alloy containing 30-40% chromium, 5-25% cobalt, 0.5-10% iron, 0.2-0.6% aluminum, 0.3-1.2% titanium, up to 0.15% carbon, about 0.2-1% yttria, up to about 0.3% nitrogen, the % titanium being at least about 1.4 times the % nitrogen, minor amounts of optional elements, the balance being essentially nickel. The consolidated and hot worked alloy with coarse grains produced by heat treatment at about 1300° C. is useful in service requiring hot strength along with extraordinary resistance to oxidation, sulfidation and hot corrosive media. Specific utilization of the alloy of the invention is contemplated in handling molten glass and in utensils adapted to be used in contact with molten glass, e.g. spinners.

43 Claims, No Drawings

MECHANICALLY ALLOYED NICKEL-COBALT-CHROMIUM-IRON COMPOSITION OF MATTER AND GLASS FIBER METHOD AND APPARATUS FOR USING SAME

The present invention is concerned with an alloy useful at high temperatures, and more particularly, with an alloy which is resistant to oxidation and sulfidation corrosion at temperatures in excess of about 1090° C. particularly in contact with molten glass or silicate slag in the presence of atmospheric oxygen. The present invention is also concerned with glass making tools, particularly spinners, made of the alloy of the invention.

Background of the Invention and Objects

In general, there is a continuing need for metallic materials which have useful strengths at temperatures in excess of 1090° C. In ordinary usage, metallic materials operating at such temperatures are exposed to the deleterious effects of oxidation and sulfidation corrosion often in the presence of molten slag-like materials, for example, molten silicate based slags and molten glass. In order to be practical, metallic materials operable at such temperatures must be hot workable so as to economically provide the shaped objects which are to be used.

It is an object of the present invention to provide such a metallic material.

It is a further object of the present invention to provide glass handling and working equipment made of the novel alloy.

It is a still further object of the present invention to provide a novel method or process of handling or containing molten slag-like materials, e.g. glass using implements having at least glass contacting parts made of the novel metallic material or alloy of the present invention.

Description of the Invention

The present invention contemplates a novel composition of matter or alloy the use of this alloy in contact with molten glass and glass forming or working objects made at least in part from the alloy, the alloy comprising in percent by weight (except where otherwise indicated) about 30-40% chromium, about 5-25% cobalt, about 0.5-10%, more specifically about 1-10%, and advantageously about 3-10% iron, about 0.2-0.6% aluminum, about 0.3-1.2% titanium, up to about 0.10% or 0.15% carbon, about 0.2-1% yttria present as yttriacontaining oxidic phase such as yttria or a yttria-alumina compound, up to about 0.3% nitrogen with the proviso that at least about 40% of the nitrogen is present primarily as TiN or a complex titanium-nitrogen compound, balance essentially nickel, said alloy being made by mechanical alloying powdered ingredients or powders of prealloyed ingredients. After mechanical alloying the alloy powders are compacted and sintered and worked, e.g. by extrusion and rolling to substantially 100% theoretical density. Thereafter to obtain the best high temperature characteristics the hot worked alloys are grain-coarsened by heat treatment for ½ hour or more at about 1316° C.

Advantageously the alloy of the invention contains not more than about 0.05% or 0.08% carbon. In the mechanically alloyed composition of the present invention carbon is present in the form of carbides, specifically $M_{23}C_6$ type carbides. The amount of these carbides should be minimized although as a practical matter, $M_{23}C_6$, e.g. $Cr_{23}C_6$ carbides equivalent in a minimum amount to about 0.01% carbon can be advantageous. As stated before, nitrogen is present in the alloys of the invention essentially as a titanium-nitrogen compound. The weight percent of titanium present in the alloy is advantageously at least about 3.5 times the weight percent of nitrogen to insure the formation of TiN. Some excess of titanium over that stoichiometrically equivalent to TiN is advantageous in enhancing the ductility of the alloys. Thus for practical alloy formulation it is advantageous for titanium to be present in weight percent in an amount of about 4 times the weight percent of nitrogen. However, as demonstrated by the examples herein, practical, advantageous alloys can have a Ti/C weight ratio as low as about 1.5. Oxygen, other than that present in $Y_2O_3$ is inevitably present in alloys of the present invention. For best ductility and hot workability, both excess oxygen and yttria (including yttria-alumina phases) should not exceed an amount equivalent to about 0.4% total oxygen as analyzed. However, it has been found that total oxygen can analyze as high as about 0.5% in an alloy having good hot workability provided that at the same time the nitrogen is less than about 0.2%. Put another way, good hot workability is generally observed when the total of weight percent of total oxygen plus nitrogen is less than about 0.7%.

Zirconium and hafnium, which experience in nickel-base high temperature alloys has taught are useful in such alloys, are not particularly useful for strengthening the alloys of the present invention. Hafnium, in particular in amounts of about 0.4–0.6% leads to the formation of an oxidic phase identified as $Y_2(Hf,Zr)_2O_7$ which appears to alter the strengthening function of yttria and yttriaalumina phases while contributing to decreased high temperature tensile elongation. This phase was formed with zirconium in the absence of hafnium only when the zirconium content of the alloy exceeded about 0.05%. Accordingly, for optimum results in terms of combined strength and ductility, the alloys of the present invention are devoid of hafnium and contain only up to about 0.05% zirconium. It has been noted that when zirconium is absent $M_{23}C_6$ phase appears to be formed in an exact equivalent to the amount of carbon present immediately upon consolidation and extrusion to bar stock. In the presence of zirconium even in an amount as low as 0.04% the amount of carbide phase measured on extruded bar stock is significantly less than that amount which would form as $M_{23}C_6$. Accordingly, it may be advantageous to avoid the presence of zirconium is alloys of the present invention so as to avoid chromium migration to a carbide phase during long term exposure at high temperatures. Minimization of chromium migration can held enhance oxidation and, in particular, sulfidation corrosion resistance. On the other hand, from the standpoint of molten glass corrosion, zirconium and hafnium in the ranges of 0.01 to 0.4% and 0.01 to 1.0% respectively, have been found to be beneficial. High temperature strength and oxidation/ sulfidation resistance of the alloys of the invention especially evident when the alloys are exposed to molten slags or glass are achieved through a combination of dispersion strengthening and a coarse elongated structure resulting from controlled thermomechanical processing. A high temperature recrystallization treatment, e.g. at 1316° C. for one hour is required to develop this favorable coarse grain structure. Prior to the grain coarsening treatment, the alloys possess excellent fabricability making them well suited in application which require hot-forming, spinning, rolling, etc.

Table I contains analyzed compositions, in weight percent, of examples of alloys of the present invention.

TABLE I

| Ingredient | Example |  |  |  |  |  |  |  |
|---|---|---|---|---|---|---|---|---|
|  | 1 | 2 | 3 | 4 | 5 | 6 | 7 | 8 |
| Cr | 32.5 | 35.6 | 38.9 | 36.3 | 35.9 | 35.7 | 35.4 | 35.7 |
| Co | 12.4 | 13.5 | 14.2 | 14.8 | 14.7 | 14.7 | 14.7 | 15.0 |
| Al | 0.44 | 0.47 | 0.49 | 0.47 | 0.47 | 0.47 | 0.48 | 0.49 |
| Ti | 0.41 | 0.42 | 0.44 | 0.44 | 0.44 | 0.44 | 0.43 | 0.48 |
| Fe | 7.0 | 6.9 | 0.91 | 2.8 | 5.4 | 8.1 | 10.8 | 9.2 |
| Zr | 0.04 | 0.05 | 0.07 | — | — | — | — | — |
| $Y_2O_3$ | 0.47 | 0.49 | 0.48 | 0.53 | 0.53 | 0.53 | 0.51 | 0.51 |
| O (Total) | 0.40 | 0.38 | 0.31 | 0.47 | 0.48 | 0.48 | 0.46 | 0.51 |
| N | 0.17 | 0.18 | 0.28 | 0.30 | 0.30 | 0.29 | 0.28 | 0.20 |
| C | 0.06 | 0.08 | 0.06 | 0.05 | 0.05 | 0.04 | 0.04 | 0.04 |
| Ni | Bal. | Bal. | Bal. | Bal. | Bal. | Bal. | Bal. | Bal. |

The alloy examples set forth in Table I were made by standard mechanical alloying and consolidation techniques such as disclosed in U.S. Pat. Nos. 3,591,362, 3,776,704, 4,386,976, 4,668,312 and in numerous technical publications. The consolidated alloys were then extruded at temperatures between about 1010° C. and 1121° C. at extrusion ratios ranging from 4.8 to 6.4 with ram speeds of 8.6 cm/sec (high) and 3.0 cm/sec (low) to form extruded bar of rectangular cross section measuring about 2.5 by 5.1 cm. Various specimens of the alloy examples were then hot rolled at various temperatures in the range of 1010° C. to 1121° C. either in a longitudinal or transverse direction (with reference to the axis of the extruded bar) to form flats about 1.3 cm thick. After rolling was completed, the specimens were heat treated at about 1316° C., e.g. 1280 to 1330° C. for at least ½ hour and preferably for one hour or more to induce formation of a coarse grain structure in the alloy. Specifically, Examples 1 and 2 were heat treated at 1316° C. for one two hours and Examples 3 to 8 were heat treated at 1316° C. for one hour subsequent to rolling in order to effect grain coarsening. Tensile specimens were cut from such rolled and heat treated flats in such fashion that the tensile test direction was either in a longitudinal or transverse direction relative to the rolling direction when the rolling direction was longitudinal (relative to extrusion) and in the rolling or the extrusion direction when the rolling was transverse to the direction of extrusion (cross rolling). Results of tensile tests conducted on these specimens in the as-rolled and grain-coarsened condition are set forth in Tables II and III with indications as to extrusion and rolling conditions.

Table II contains tensile data with respect to Examples 1, 2, 3 and 8 as representative of tensile characteristics measured at about 954° C. of the most advantageous alloys of the present invention.

TABLE II

| Example No. | Extrusion | | | Rolling | | Test Direction | YS (MPa) | UTS (MPa) | El. (%) | RA (%) |
|---|---|---|---|---|---|---|---|---|---|---|
|  | Ram Speed* | Ratio | Temp. (°C.) | Direction | Temp. (°C.) |  |  |  |  |  |
| 1 | H | 4.8 | 1010 | Cross | 1038 | Roll | 57.9 | 71.7 | 43.0 | 58 |
| 1 | H | 4.8 | 1010 | Cross | 1038 | Ext. | 53.8 | 73.1 | 54.0 | 67 |
| 2 | H | 6.4 | 1010 | Long. | 1038 | Long. | 57.2 | 73.1 | 41.0 | 59 |
| 2 | H | 6.4 | 1010 | Long. | 1038 | Long. | 55.2 | 93.1 | 70.0 | 68 |
| 2 | H | 6.4 | 1010 | Long. | 1121 | Long. | 55.2 | 76.5 | 72.0 | 76 |
| 2 | H | 6.4 | 1010 | Long. | 1121 | Long. | 40.7 | 59.3 | 61.0 | 73 |
| 2 | H | 6.4 | 1066 | Long. | 1121 | Long. | 49.0 | 72.4 | 81.0 | 70 |
| 2 | H | 6.4 | 1066 | Long. | 1121 | Long. | 48.3 | 60.7 | 68.0 | 73 |
| 2 | H | 6.4 | 1121 | Long. | 1038 | Long. | 80.3 | 77.2 | 79.0 | 69 |
| 2 | H | 6.4 | 1121 | Long. | 1038 | Long. | 45.5 | 71.0 | 79.0 | 68 |
| 3 | H | 4.8 | 1093 | Long. | 1038 | Long. | 65.5 | 78.6 | 49.0 | 61 |
| 3 | H | 4.8 | 1121 | Long. | 1038 | Long. | 84.8 | 91.0 | 54.0 | 60 |
| 3 | H | 4.8 | 1121 | Long. | 1038 | Trans. | 84.8 | 88.9 | 41.0 | 46 |
| 3 | H | 4.8 | 1093 | Cross | 1038 | Roll | 72.4 | 87.6 | 31.0 | 42 |
| 3 | H | 4.8 | 1121 | Cross | 1038 | Roll | 67.6 | 76.5 | 45.0 | 41 |
| 3 | H | 4.8 | 1121 | Cross | 1038 | Ext. | 77.9 | 87.6 | 54.0 | 61 |
| 8 | L | 4.8 | 1066 | Cross | 1010 | Ext. | 67.4 | 77.2 | 48.0 | 49 |
| 8 | L | 4.8 | 1066 | Cross | 1010 | Roll | 54.2 | 68.9 | 29.2 | 31 |
| 8 | L | 4.8 | 1066 | Cross | 1066 | Ext. | 50.1 | 66.9 | 32.0 | 46 |
| 8 | L | 4.8 | 1066 | Cross | 1066 | Roll | 50.3 | 65.0 | 34.8 | 37 |
| 8 | L | 4.8 | 1066 | Cross | 1121 | Ext. | 56.8 | 71.0 | 48.8 | 46 |
| 8 | L | 4.8 | 1066 | Cross | 1121 | Roll | 49.0 | 63.4 | 34.8 | 42 |
| 8 | L | 4.8 | 1066 | Long. | 1066 | Long. | 59.4 | 73.1 | 61.5 | 41 |
| 8 | L | 4.8 | 1066 | Long. | 1066 | Trans. | 55.4 | 69.7 | 32.0 | 32 |
| 8 | H | 4.8 | 1066 | Cross | 1010 | Ext. | 68.9 | 74.5 | 53.0 | 50 |
| 8 | H | 4.8 | 1066 | Cross | 1010 | Roll | 51.6 | 66.5 | 36.2 | 31 |
| 8 | H | 4.8 | 1066 | Cross | 1066 | Ext. | 60.1 | 71.7 | 55.8 | 43 |
| 8 | H | 4.8 | 1066 | Cross | 1066 | Roll | 48.8 | 64.6 | 33.4 | 29 |
| 8 | H | 4.8 | 1066 | Cross | 1121 | Ext. | 55.2 | 65.5 | 55.8 | 47 |
| 8 | H | 4.8 | 1066 | Cross | 1121 | Roll | 45.6 | 62.2 | 32.0 | 33 |
| 8 | H | 4.8 | 1066 | Long. | 1066 | Long. | 53.1 | 64.8 | 47.4 | 53 |
| 8 | H | 4.8 | 1066 | Long. | 1066 | Trans. | 44.1 | 61.9 | 48.0 | 33 |

*L = Low
H = High

The alloys for which tensile characteristics at 954° C. are set forth in Table II are most advantageous primarily because, given the optimum extrusion and rolling conditions, they can exhibit hot tensile elongations of at least 40% indicative of excellent hot workability after grain coarsening. Even at their worst, Examples 1, 2, 3 and 8 show tensile elongations in the least favored test direction of at least about 30% when tested at 954° C., indicative of reasonable hot workability. Examples 1, 2, 3 and 8 like all other examples of alloys of the present invention as set forth in Table I exhibit excellent resistance to sulfidation corrosion as well as extraordinary oxidation resistance at elevated temperatures especially in the presence of molten glass. All the examples set forth in Table I are also remarkably resistant to corrosion in acidic slag-like media, these corrosion resistance characteristics being indicative of utility in applications requiring elevated temperature strength and corrosion resistance to glass or slag. Such applications might include superheater tubes and shields, soot blower parts, boiler splash and baffle plates, separation hardware in areas of power generation, thermal and chemical processing and the pyrolysis of waste materials such as spent pulping liquors as well as glass handling and working tools, equipment, etc.

An alloy range exemplified by Examples 1, 2, 3 and 8 comprises, in percent by weight, about 32 to 39% chromium, about 10 to 16% cobalt, about 0.4 to 0.6% aluminum, about 0.4 to about 0.6% yttria (as yttria or any yttria-alumina compound), about 0.3 to about 0.5% total oxygen, about 0.15 to about 0.3% nitrogen, about 0.5 to about 0.7% total oxygen plus nitrogen, up to about 0.08% carbon, with the balance being essentially nickel. As total oxygen and total oxygen plus nitrogen increases, there is a tendency for high temperature strength to increase and a marked tendency for high temperature ductility as measured by tensile elongation at 954° C. to decrease. For example, the average tensile elongation at 954° C. for Examples 5, 6 and 7 over all the test conditions employed for Example 8 as disclosed in Table II are 23.3%, 25.9% and 28.6% respectively compared to an average of 42.7% for the tensile elongation of Example 8. While alloys conforming to Examples 5, 6 and 7 are useful, the enhanced ductility of Examples 1, 2, 3 and 8 make them especially advantageous. A comparison between Examples 5 to 7 on the one hand and Example 8 on the other hand indicates that this enhanced utility can be attributed to a lowering of the total oxygen plus nitrogen. This is confirmed by the still further enhanced high temperature ductility of Examples 1 to 3 wherein the total oxygen plus nitrogen is below about 0.6%.

Without being limited by any statement of theory, it is believed by some that the excellent corrosion (oxidation and sulfidation) resistance of the alloys of the invention can be attributed to the fact that stable carbides, aluminum oxides, and stable nitrides tend to block chromium diffusion down grain boundaries. This blocking of diffusion tends to eliminate chromium depleted areas in the alloy and lessen the chance for selective area attack by liquid and gaseous corrodants. Others believe that the excellent glass corrosion resistance of the alloys and articles of the present invention is primarily due to the high chromium content of the alloy which provides the alloy with the ability to form and repair a predominantly $Cr_2O_3$ scale at high temperatures in the presence of molten glass exposed to air. Compared to certain cast alloys used for glass spinners, the chromium in the presently disclosed alloy is not tied up as carbides and is thus available for formation of scale rich in chromium oxide. In the view of these others, reduction of rapid grain boundary diffusion of chromium is effective primarily to reduce glass corrosion assisted grain boundary cracking rather than being effective to minimize overall corrosion rate. Regardless of any explanation, each of the examples set forth in Table I exhibit this excellent overall resistance to corrosion in molten glass even though some examples contain in the vicinity of 10% iron. In the alloys of the invention, it is believed that the presence of iron tends to make the alloy more tolerant of any nitrogen content which is not tied up as a stable nitrogencontaining phase. In amounts up to about 10%, iron can serve this nitrogen-tolerance function which tends to enhance hot workability without any discernible detrimental effect on corrosion resistance.

Additional typical 954° C. tensile results are set forth in Table III for alloys of the invention not deemed to be the most advantageous.

TABLE III

| Example No. | Extrusion Ram Speed* | Ratio | Temp. (°C.) | Rolling Direction | Temp. (°C.) | Test Direction | YS (MPa) | UTS (MPa) | El. (%) | RA (%) |
|---|---|---|---|---|---|---|---|---|---|---|
| 4 | L | 4.8 | 1066 | Cross | 1010 | Roll | 96.6 | 109.7 | 25.0 | 26 |
| 4 | H | 4.8 | 1066 | Cross | 1066 | Ext. | 106.2 | 122.1 | 22.1 | 52 |
| 4 | H | 4.8 | 1066 | Long. | 1066 | Long. | 106.9 | 121.4 | 31.4 | 54 |
| 5 | L | 4.8 | 1066 | Cross | 1121 | Ext. | 102.1 | 120.7 | 25.0 | 49 |
| 5 | H | 4.8 | 1066 | Cross | 1010 | Roll | 93.1 | 106.9 | 22.1 | 20 |
| 5 | L | 4.8 | 1066 | Long. | 1066 | Trans. | 100.0 | 113.1 | 22.0 | 26 |
| 6 | L | 4.8 | 1066 | Cross | 1066 | Ext. | 93.8 | 109.0 | 26.4 | 49 |
| 6 | L | 4.8 | 1066 | Cross | 1066 | Roll | 91.0 | 106.9 | 20.7 | 34 |
| 6 | H | 4.8 | 1066 | Long. | 1066 | Long. | 88.3 | 104.1 | 29.2 | 60 |
| 6 | H | 4.8 | 1066 | Long. | 1066 | Trans. | 71.7 | 88.3 | 26.0 | 28 |
| 7 | L | 4.8 | 1066 | Cross | 1066 | Ext. | 89.0 | 106.9 | 30.6 | 53 |
| 7 | L | 4.8 | 1066 | Cross | 1066 | Roll | 86.9 | 104.1 | 25.8 | 37 |
| 7 | L | 4.8 | 1066 | Long. | 1066 | Long. | 82.8 | 101.4 | 23.0 | 52 |
| 7 | L | 4.8 | 1066 | Long. | 1066 | Trans. | 76.6 | 93.8 | 30.0 | 31 |

*L = Low
H = High

A comparison of Tables II and III shows that in general the results in Table III indicate somewhat stronger and less ductile alloys than indicated by the results in Table II. For purposes envisioned by applicants, alloys exemplified by Examples 1, 2, 3 and 8 are markedly superior to alloys exemplified by Examples 4 to 7, although both sets of alloys are within the broadest contemplation of the present invention.

Also within the broadest contemplation of the present invention are alloys as set forth, in weight percent, in Table IV.

TABLE IV

| Ingredient | Example No. 9 | 10 | 11 |
|---|---|---|---|
| Cr | 34.8 | 37.6 | 38.2 |
| Co | 14.8 | 14.7 | 14.7 |
| Al | 0.47 | 0.44 | 0.45 |
| Ti | 0.43 | 0.44 | 0.44 |
| Fe | 1.05 | 0.95 | 0.84 |
| Zr | 0.07 | 0.10 | 0.30 |
| Hf | — | 0.41 | 0.60 |
| $Y_2O_3$ | 0.49 | 0.48 | 0.50 |
| O (Total) | 0.42 | 0.43 | 0.47 |
| N | 0.23 | 0.27 | 0.30 |

TABLE IV-continued

| | Example No. | | |
|---|---|---|---|
| Ingredient | 9 | 10 | 11 |
| C | 0.09 | 0.08 | 0.06 |
| Ni | Bal. | Bal. | Bal. |

These examples were mechanically alloyed and prepared in exactly the same manner as the examples of Table I. Results of tensile testing at 954° C. of specimens prepared from Examples 9 to 11 are set forth in Table V. These results were obtained on specimens uniformly produced by extrusion at a high ram speed, an extrusion ratio of 4.8 and a temperature of about 1066° C. The extruded material was cross rolled at a temperature of about 1038° C. to form stock about 1.3 cm thick.

TABLE V

| Example No. | Test Direction | YS (MPa) | UTS (MPa) | El. (%) | RA (%) |
|---|---|---|---|---|---|
| 9 | Roll | 79.3 | 92.4 | 25 | 44 |
| 9 | Roll | 77.9 | 85.5 | 23 | 50 |
| 9 | Ext. | 74.5 | 94.5 | 28 | 57 |
| 9 | Ext. | 79.3 | 86.9 | 26 | 53 |
| 10 | Roll | 80.7 | 100.0 | 20 | 39 |
| 10 | Roll | 88.9 | 101.4 | 27 | 57 |
| 10 | Ext. | 82.7 | 104.1 | 23 | 15 |
| 10 | Ext. | 86.2 | 102.7 | 23 | 57 |
| 11 | Roll | 103.4 | 122.0 | 14 | 40 |
| 11 | Roll | 106.9 | 124.1 | 15 | 40 |
| 11 | Ext. | 97.9 | 121.3 | 15 | 53 |
| 11 | Ext. | 108.2 | 126.9 | 16 | 52 |

The data in Table V combined with the compositions in Table IV show that as the zirconium plus hafnium content of the alloys increases, the alloys get stronger at the expense of hot ductility. A comparison of Example 3 (Tables I and II) and Example 9 (Tables IV and V) shows the effect of a minor increase in total oxygen plus nitrogen as well as a higher carbon level. All three of these elements form grain boundary phases, oxides, nitrides, carbides and complexes thereof. In the least advantageous alloy from the hot ductility standpoint, that is Example 9, carbon, although within the range contemplated for the invention, is 50% higher than the carbon level of Example 3. Also, in Example 9, total oxygen plus nitrogen is 0.65% whereas in Example 3 the same total is 0.59%. Thus, in order to achieve the optimum combination of high temperature strength and ductility achieved by the most advantageous alloys of the invention, the total oxygen plus nitrogen should be low when carbon is relatively high. This is especially significant when as in Examples 3 and 9, the iron content of the alloys is below the advantageous minimum of 3%. Specifically, carbon should be maintained below about 0.07% and total oxygen and nitrogen should be less than about 0.6% or even 0.5% to provide optimum results in both low iron and high iron alloys of the present invention. It is to be noted with regard to Example 11 that analysis of phases remaining after the alloy is attacked by hydrochloric acid indicates that no free yttria or yttria-alumina phases exist in the alloy. According to the analysis the alloy contains about 1.75% of an oxidic phase of the general formula $Y_2(HfZr)_2O_7$ about 0.10% alumina, about 0.38% of a $M_{23}C_6$ carbidic phase and about 0.58% of a TiN phase.

Table IV shows that the alloys of the present invention can contain up to about 0.4% zirconium and up to about 1% hafnium The presence of these elements further enhances the glass corrosion resistance. In like manner other elements can be present in amounts up to about 10% total and in individual amounts of up to about 1% silicon, up to about 2% manganese, up to about 0.05% boron, up to about 1% of any of niobium, tantalum, molybdenum, tungsten or rhenium and up to about 1% total of yttrium and the lanthanides. Generally speaking, alloys made by mechanical alloying are made from pure materials which contain only very small amounts of incidental or tramp elements. However, it is considered that the aforestated amounts of named elements can be tolerated in alloys of the invention without substantial detrimental effect and may, in some instances, be advantageous.

In order to show the advantages of the alloys of the present invention when used as implements or containers in a method or process of handling or containing molten acidic slag or slag-like materials, e.g. glass, a bath of molten "C" glass was established at 1200° C. The "C" glass had a composition in percent by weight silica 65%, alumina 4%, sodium oxide 8.5%, calcia 14%, magnesia 3% and boron oxide 5%. Specimens of two commercially available mechanically alloyed, nickel-base alloys (Alloys A and B) not within the invention and a sample of the alloy of Example 2 were half immersed as rods in the aforedescribed molten glass bath for 5 days. The results of this testing are set forth in Table VI.

TABLE VI

| Alloy | Melt Line Attack Diameter Loss/day (mm) | Total Immersion Attack Diameter Loss/Day (mm) |
|---|---|---|
| A | 0.04 | 0.035 |
| B | 0.03 | 0.03 |
| Ex 2 | 0.00 | 0.01 |

As stated hereinbefore, the alloys of the present invention are particularly useful in the form of glass working tools or implements such as a spinner. Generally speaking, when making glass or mineral wool, one passes a molten material, glass or slag through a foraminous wall of a metal alloy spinner. The molten material having passed through the openings or apertures in the wall solidifies as fiber. An illustration of the mechanical form of a glass spinner and associated equipment is set forth in U.S. Patent No. 4,761,169 as well as the composition of a cobalt-base alloy (not encompassed within the present invention) hereinafter identified as Alloy C. Specimens of Alloy A, Alloy C and the alloy of Example 2 were fixed inside a spinner forming glass fiber from a standard production wool glass. The average corrosion rates of these specimens as measured by actual surface recession rate, not depth of penetration, are set forth in Table VII.

TABLE VII

| Alloy | Corrosion Rate mm/day |
|---|---|
| A | 0.0586(2) |
| C | 0.0326(11) |
| Ex 2 | 0.0186(8) |

Those skilled in the art will observe from the data in Table VII that the alloy of Example 2 can be employed as a foraminous walled spinner for making glass wool. This structure can be described as a cup-shaped or bowl-shaped vessel adapted to rotate about its vertical central axis and having as the wall of the cup or bowl a foraminous body of metal alloy having the composition of the alloy of the present invention as described hereinbefore. Advantageously, the entire structure is made of the alloy of the present invention but, of course, this is not necessary. The aperture through the foraminous wall of the cup- or bowl-shaped structure are of the same size and configuration as is customary in the art. The data in Table VII should also suggest to those of normal skill in the glass art that other structures in contact with molten glass, e.g. stirrers, submerged combustion burner parts and the like can also advantageously be constructed from the alloy of the present invention. Of even greater significance from a corrosion standpoint are the corrosion resistance results obtained with samples of Examples 10 and 11 containing respectively 0.41% and 0.60% hafnium. These alloys which exhibit excellent strength, albeit at a small sacrifice in ductility are exceptionally resistant to the corrosive effects of molten glass showing average daily corrosion rates under the test conditions outlined as to Table VII of 0.0058 mm/day. This corrosion rate is roughly half the corrosion rate exhibited by Example 2 and indicates extraordinary utility of objects made of the alloys of Examples 10 and 11 with molten glass.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A mechanically alloyed composition of matter consisting in weight percent essentially of about 30–40% chromium, about 5–25% cobalt, about 0.5–10% iron, about 0.2–0.6% aluminum, about 0.3–1.2% titanium, up to about 0.15% carbon, about 0.2–1% of yttria in a yttria-containing oxidic phase, up to about 0.7% oxygen inclusive of the oxygen in yttria, up to about 0.3% nitrogen with the proviso that the weight of said titanium is at least about 1.5 times the weight of nitrogen, up to about 0.4% zirconium, up to about 1% hafnium, up to about 1% silicon, up to about 2% manganese, up to about 0.05% boron, up to about 1% niobium, up to about 1% tantalum, up to about 1% molybdenum, up to about 1% tungsten, up to about 1% rhenium, up to about 1% total yttrium and the lanthanides provided that the total of hafnium, silicon, manganese, boron, niobium, tantalum, molybdenum, tungsten, rhenium, yttrium and the lanthanides does not exceed about 10%, the balance of the composition being essentially nickel.

2. A consolidated composition of matter as in claim 1 comprising an alloy having a density substantially equal to 100% theoretical density.

3. A composition of matter as in claim 1 wherein the iron is about 1–10% by weight.

4. An alloy as in claim 2 wherein the carbon content does not exceed 0.10% and the total oxygen plus nitrogen does not exceed about 0.6%.

5. An alloy as in claim 2 wherein hafnium is absent and zirconium does not exceed 0.07%.

6. An alloy as in claim 2 wherein the hafnium content is about 0.4 to about 0.6%.

7. An alloy as in claim 2 wherein titanium is present in an amount sufficient to tie up nitrogen in a stable grain boundary phase.

8. An alloy as in claim 2 which contains at least about 3% iron.

9. An alloy as in claim 2 wherein the nitrogen does not exceed about 0.2%.

10. An alloy as in claim2 wherein carbon is less than 0.07%, the total oxygen plus nitrogen does not exceed about 0.5% and the iron content is less than 3%.

11. An alloy as in claim2 wherein the carbon is less than 0.07%, the total oxygen plus nitrogen does not exceed 0.6% and the iron is about 3% to 10%.

12. An alloy as in claim 11 wherein the zirconium is less than 0.07% and hafnium is absent.

13. An alloy as in claim 2 consisting essentially of about 32–38% chromium, about 10–16% cobalt, about 0.4–0.6% aluminum, about 0.4–0.6% titanium, about 1–10% iron, up to about 0.07% zirconium, about 0.4–0.6% yttria in a yttria-containing oxidic phase, about 0.3–0.5% total oxygen, about 0.15–0.3% nitrogen, about 0.5–0.7% total oxygen plus nitrogen, up to about 0.08% carbon with the balance being essentially nickel.

14. An alloy as in claim 13 wherein the percent carbon and percent total oxygen plus nitrogen are interrelated such that when the percent carbon is high, the percent total oxygen plus nitrogen is low and vice versa.

15. An alloy as in claim 13 wherein the nitrogen does not exceed about 0.2%.

16. In the method of handling material from the group of molten glass and molten slag in the presence of atmospheric oxygen, the improvement comprising employing as a handling device a metallic structure composed, at least in the material contacting portion of said device, of a coarse-grained, mechanically alloyed alloy consisting in weight percent essentially of about 30–40% chromium, about 5–25% cobalt, about 0.5–10% iron, about 0.2–0.6% aluminum, about 0.3–1.2% titanium, up to about 0.15% carbon, about 0.2–1% of yttria in a yttria-containing oxidic phase, up to about 0.7% oxygen inclusive of the oxygen in yttria, up to about 0.3% nitrogen with the proviso that the weight of said titanium is at least about 1.5 times the weight of nitrogen, up to about 0.4% zirconium, up to about 1% hafnium, up to about 1% silicon, up to about 2% manganese, up to about 0.05% boron, up to about 1% niobium, up to about 1% tantalum, up to about 1% molybdenum, up to about 1% tungsten, up to about 1% rhenium, up to about 1% total yttrium and the lanthanides provided that the total of hafnium, silicon, manganese, boron, niobium, tantalum, molybdenum, tungsten, rhenium, yttrium and the lanthanides does not exceed about 10%, the balance of the composition being essentially nickel.

17. A method as in claim 16 wherein in said alloy the carbon content does not exceed 0.10% and the total oxygen plus nitrogen does not exceed about 0.6%.

18. A method as in claim16 wherein in said alloy hafnium is absent and zirconium does not exceed 0.07%.

19. A method as in claim16 wherein said alloy contains about 0.4% to 0.6% hafnium.

20. A method as in claim 16 wherein in said alloy titanium is present in an amount sufficient to tie up nitrogen in a stable grain boundary phase.

21. A method as in claim 16 wherein said alloy contains at least about 1% iron.

22. A method as in claim 16 wherein said alloy contains at least about 3% iron.

23. A method as in claim 16 wherein in said alloy the nitrogen does not exceed about 0.2%.

24. A method as in claim 16 wherein in said alloy carbon is less than 0.07%, the total oxygen plus nitrogen does not exceed about 0.5% and the iron content is less than 3%.

25. A method as in claim 16 wherein in said alloy the carbon s less than 0.07%, the total oxygen plus nitrogen does not exceed 0.6% and the iron is about 3% to 10%.

26. A method as in claim 25 wherein in said alloy the zirconium is less than 0.07% and hafnium is absent.

27. A method as in claim 16 wherein said alloy consists essentially of about 32-38% chromium, about 10-16% cobalt, about 0.4-0.6% aluminum, about 0.4-0.6% titanium, about 1-10% iron, up to about 0.07% zirconium, about 0.4-0.6% yttria in a yttria-containing oxidic phase, about 0.3-0.5% total oxygen, about 0.15-0.3% nitrogen, about 0.5-0.7% total oxygen plus nitrogen, up to about 0.08% carbon with the balance being essentially nickel.

28. A method as in claim 26 wherein in said alloy the percent carbon and percent total oxygen plus nitrogen are interrelated such that when the percent carbon is high, the percent total oxygen plus nitrogen is low and vice versa.

29. A method as in claim 26 wherein in said alloy the nitrogen does not exceed about 0.2%.

30. A foraminously walled glass spinner, at least the foraminous wall of which is made of a coarse-grained mechanically alloyed alloy of substantially 100% theoretical density which consists, in weight percent essentially of about 30-40% chromium, about 5-25% cobalt, about 0.5-10% iron, about 0.2-0.6% aluminum, about 0.3-1.2% titanium, up to about 0.15% carbon, about 0.2-1% of yttria in a yttria-containing oxidic phase, up to about 0.7% oxygen inclusive of the oxygen in yttria, up to about 0.3% nitrogen with the proviso that the weight of said titanium is at least about 1.5 times the weight of nitrogen, up to about 0.4% zirconium, up to about 1% hafnium, up to about 1% silicon, up to about 2% manganese, up to about 0.05% boron, up to about 1% niobium, up to about 1% tantalum, up to about 1% molybdenum, up to about 1% tungsten, up to about 1% rhenium, up to about 1% total yttrium and the lanthanides provided that the total of hafnium, silicon, manganese, boron, niobium, tantalum, molybdenum, tungsten, rhenium, yttrium and the lanthanides does not exceed about 10%, the balance of the composition being essentially nickel.

31. A glass spinner as in claim 30 wherein in said alloy the carbon content does not exceed 0.10% and the total oxygen plus nitrogen does not exceed about 0.6%.

32. A glass spinner as in claim 30 wherein in said alloy hafnium is absent and zirconium does not exceed 0.07%.

33. A glass spinner as in claim 30 wherein said alloy contains about 0.4% to about 0.6% hafnium.

34. A glass spinner as in claim 30 wherein in said alloy titanium is present in an amount sufficient to tie up nitrogen in a stable grain boundary phase.

35. A glass spinner as in claim 30 wherein said alloy contains at least about 1% iron.

36. A glass spinner as in claim 30 wherein said alloy contains at least about 3% iron.

37. A glass spinner as in claim 30 wherein in said alloy the nitrogen does not exceed about 0.2%.

38. A glass spinner as in claim 30 wherein in said alloy carbon is less than 0.07%, the total oxygen plus nitrogen does not exceed about 0.5% and the iron content is less than 3%.

39. A glass spinner as in claim 30 wherein in said alloy the carbon is less than 0.07%, the total oxygen plus nitrogen does not exceed 0.6% and the iron is about 3% to 10%.

40. A glass spinner as in claim 39 wherein in said alloy the zirconium is less than 0.07% and hafnium is absent.

41. A glass spinner as in claim 30 wherein said alloy consists essentially of about 32-38% chromium, about 10-16% cobalt, about 0.4-0.6% aluminum, about 0.4-0.6% titanium, about 1-10% iron, up to about 0.07% zirconium, about 0.4-0.6% yttria in a yttria-containing oxidic phase, about 0.3-0.5% total oxygen, about 0.15-0.3% nitrogen, about 0.5-0.7% total oxygen plus nitrogen, up to about 0.08% carbon with the balance being essentially nickel.

42. A glass spinner as in claim 41 wherein in said alloy the percent carbon and percent total oxygen plus nitrogen are interrelated such that when the percent carbon is high, the percent total oxygen plus nitrogen is low and vice versa.

43. A glass spinner as in claim 41 wherein in said alloy the nitrogen does not exceed about 0.2%.

* * * * *